(12) United States Patent
Mori et al.

(10) Patent No.: US 8,479,450 B2
(45) Date of Patent: Jul. 9, 2013

(54) WEATHER STRIP HAVING A DRAINAGE STRUCTURE

(75) Inventors: Kousuke Mori, Hiroshima (JP); Hirofumi Ogawa, Hiroshima (JP)

(73) Assignee: Nishikawa Rubber Co., Ltd., Hiroshima, Hiroshima-ken (JP)

( * ) Notice: Subject to any disclaimer, the term of this patent is extended or adjusted under 35 U.S.C. 154(b) by 0 days.

(21) Appl. No.: 13/298,900

(22) Filed: Nov. 17, 2011

(65) Prior Publication Data
US 2012/0159858 A1  Jun. 28, 2012

(30) Foreign Application Priority Data

Dec. 22, 2010  (JP) .................................. 2010-285886

(51) Int. Cl.
*E06B 7/16* (2006.01)
(52) U.S. Cl.
USPC ............................ 49/476.1; 49/498.1; 49/440
(58) Field of Classification Search
USPC ...................................... 49/476.1, 498.1, 440
See application file for complete search history.

(56) References Cited

U.S. PATENT DOCUMENTS

| 1,429,203 | A | * | 9/1922 | Hartstra | 49/476.1 |
| 4,919,471 | A | * | 4/1990 | Seino et al. | 296/154 |
| 6,226,926 | B1 | * | 5/2001 | Aritake et al. | 49/440 |
| 7,197,850 | B2 | * | 4/2007 | Mizutani et al. | 49/498.1 |

FOREIGN PATENT DOCUMENTS

| JP | 10-071860 | 3/1998 |
| JP | 2006-264594 | 10/2006 |

* cited by examiner

*Primary Examiner* — Gregory J. Strimbu
(74) *Attorney, Agent, or Firm* — Robert P. Michal; Lucas & Mercanti, LLP (57) ABSTRACT

A weather strip includes an installation base member installed on a door opening edge of a retractable roof vehicle; a hollow seal part provided on an outer-cabin side with respect to the installation base member, the seal part makes elastic contact with a top end of a door glass; and a seal lip extending from the base member and having a top end which curves and makes elastic contact with an inner-cabin side surface of the door glass, the seal part and the seal lip forming an eaves-trough-shaped water receiving part, wherein: a wall surface of the hollow seal part, with which the top end of the door glass makes elastic contact, has a head part formed thereon for guiding water to a drainage hole.

9 Claims, 7 Drawing Sheets

WEATHER STRIP HAVING A DRAINAGE STRUCTURE

This application claims the benefit under 35 USC 119 of JP Patent Application JP 2010-285886 filed Dec. 22, 2010, the entire disclosure of which is incorporated herein by reference.

BACKGROUND OF THE INVENTION

The present invention relates to drainage structure of weather strips installed along door opening edges of retractable roof vehicles including convertible vehicles or hard top vehicles, that make elastic contact with door glasses to seal outside and inside of vehicles.

Figure 8:
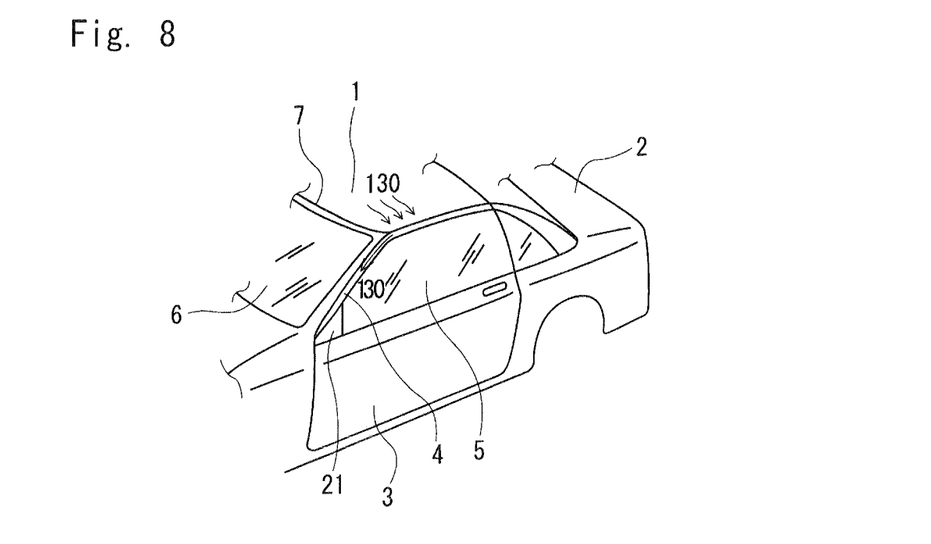
FIG. 8 is an external perspective view of a retractable roof vehicle.
Figure 9:
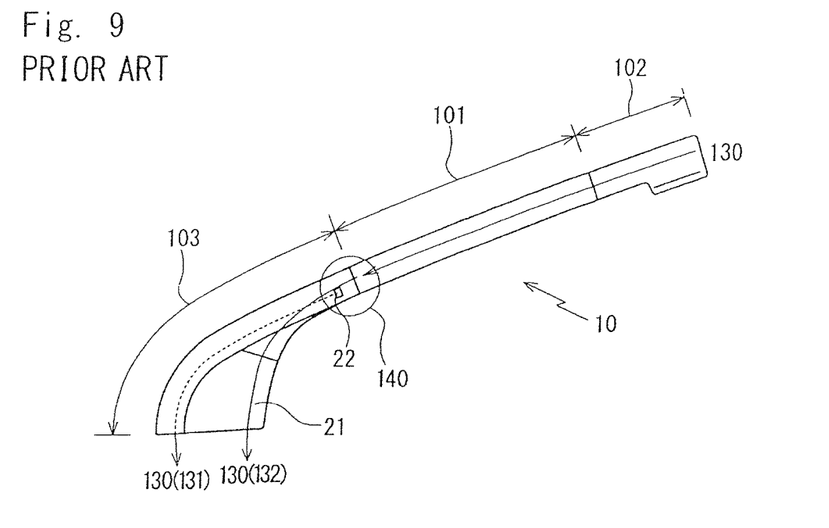
FIG. 9 is a perspective view showing a drainage structure of a weather strip according to a prior art.
Figure 10:
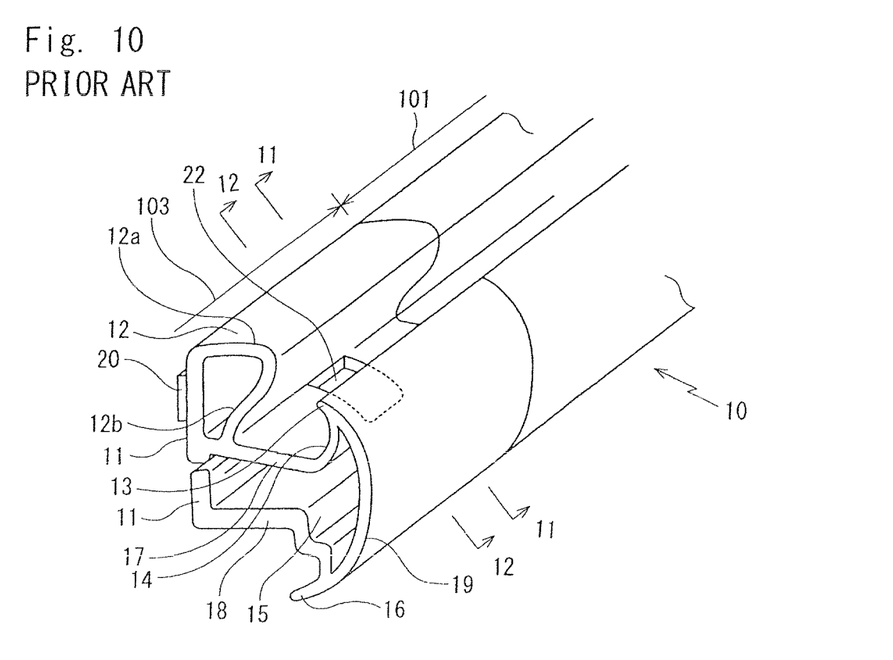
FIG. 10 is an enlarged perspective view of part 140 of FIG. 9.
Figure 11:
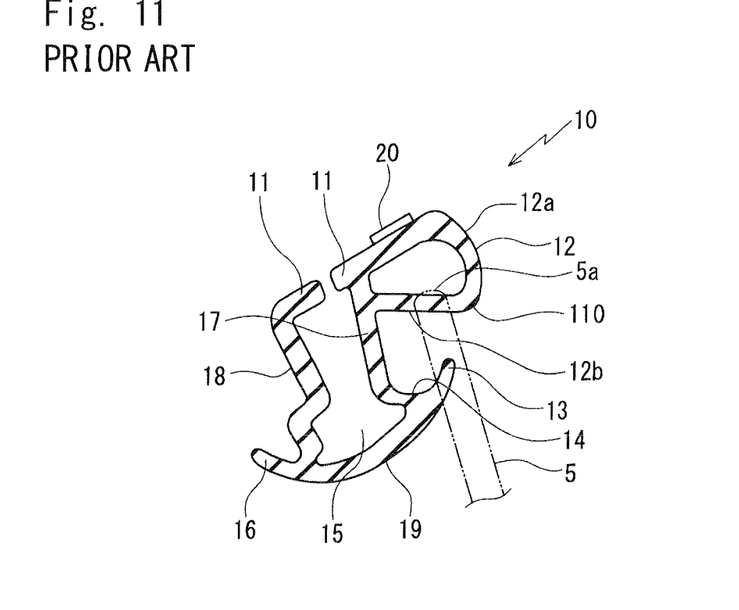
FIG. 11 is a 11-11 line enlarged cross section of FIG. 10.
Figure 12:
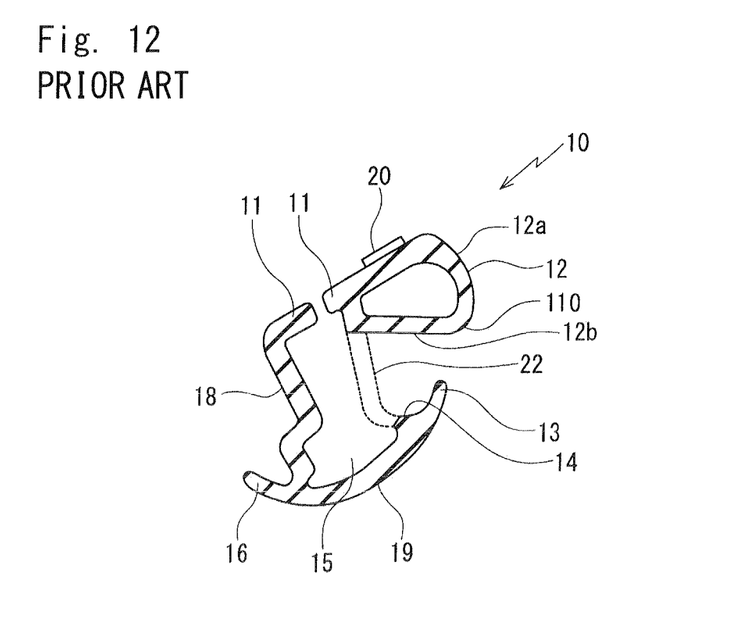
FIG. 12 is a 12-12 line enlarged cross section of FIG. 10.

FIG. 8 is an external view of one type of retractable roof vehicles of which roofs that open and close are folded to open. The roof comprises a soft top 1 which is folded and put away in a trunk 2 on a lower rear side of a vehicle. Another roof of the retractable roof vehicle comprises a roof panel and a back window panel at the back of the roof panel instead of the soft top 1, which are folded and put away in the trunk 2 while the roof panel as folded is piled on the back window panel. Such vehicles are generally called retractable hard top, coupe cabriolet or coupe convertible.

In the retractable roof vehicle, a front pillar 4 and the soft top 1 as an opening edge of a door 3 have a weather strip 10 installed on side edges thereof via tape 20 (alternatively, the weather strip 10 may also be fit in holders including retainers). The weather strip 10 makes elastic contact with a door glass (side glass) 5 that lifts or lowers when the door 3 is closed to seal outside and inside of the vehicle.

As shown in FIG. 9 to FIG. 12, the weather strip 10 installed on the side edge of the front pillar 4 comprises an extrusion molded part 101 and die molded parts 102, 103 which are connected to the extrusion molded part 101 and are respectively on an upper side and a lower side of a vehicle when the weather strip 10 is assembled on the vehicle. The die molded part 102 on the upper side is connected to an edge of a header weather strip (not shown) installed on a header 7 which fixes an upper end of a front glass 6 whereas the die molded part 103 on the lower side has a gusset 21 installed thereon, which is unified with a door mirror (not shown).

The weather strip 10 comprises: an installation base member 11 having the tape 20 adhered thereon; a hollow seal part 12 integrally molded with the installation base member 11, which makes elastic contact with a top end 5a of the door glass 5 that lifts or lowers; and a seal lip 13 extending from a lower side of the hollow seal part 12 toward an outer-cabin side, which makes elastic contact with an inner-cabin side surface of the of the door glass 5 that lifts or lowers. A top end of the seal lip 13 makes elastic contact with the inner-cabin side surface of the door glass 5 in such a manner as to curve upward, thereby forming an eaves-trough-shaped water receiving part 14 on a base root side thereof.

The seal lip 13 has a hollow part 15 provided on an inner-cabin side thereof. The hollow part 15 has a lip 16 on the inner-cabin side thereof which abuts interior material (not shown) including garnish.

The die molded part 103 on the lower side of the weather strip 10 has a drainage hole 22 formed thereon which bores from the water receiving part 14 to the hollow part 15 so that water 130 guided from an upper side of the weather strip 10 to the water receiving part 14 on a lower side is further guided to the hollow part 15 via the drainage hole 22. The water 130 (131) guided to the hollow part 15 is drained outside the vehicle from a front side of the vehicle.

Various techniques have been adopted concerning the drainage structure of the weather strips of which hollow seal part and seal lip make elastic contact respectively with the top end and the inner-cabin side surface of the door glass that lifts or lowers, thereby doubly-sealing the door glass from an upper side and a lower side (see the Japanese unexamined Patent Publications No. 2006-264594 and 10-71860).

The Japanese unexamined Patent Publication No. 2006-264594 discloses to mold only a water receiving lip of the molded part on the upper side with solid rubber, which protrudes toward the outer-cabin side compared with the door glass and receives water dripping from a soft top. The Japanese unexamined Patent Publication No. 10-71860 discloses to form a seal lip on a parting on a top end of the soft top in such a manner as to protrude toward the outer-cabin side so that the seal lip receives the water which flows along the soft top.

Figure 13:
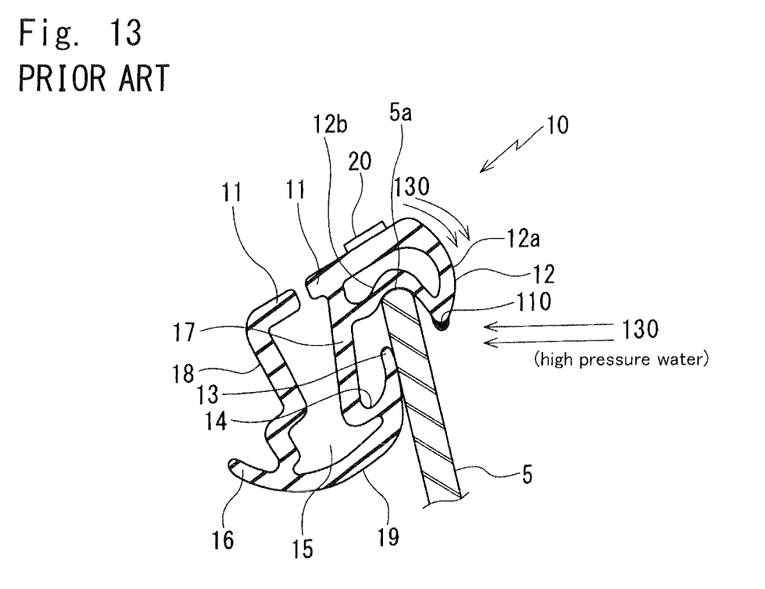
FIG. 13 is a I-I line enlarged cross section of FIG. 10, showing a state that a door glass is lifted in FIG. 11.

According to the ordinary weather strip 10 shown in FIG. 13, when the glass 5 lifts up, the top end 5a of the door glass 5 is wrapped up by a lower side wall surface 12b of the hollow seal part 12, which is thrust up and curved by the top end 5a. Accordingly, even in case the door glass 5 is subjected to high pressure water of car washing, the water 130 is prevented from entering the inner-cabin side from the outer-cabin side via a space between the top end 5a of the door glass 5 and the lower side wall surface 12b of the hollow seal part 12. In addition, in case the water 130 enters the inner-cabin side, the water 130 that flows down an inner-cabin side surface of the door glass 5 is dammed up by the seal lip 13 and is guided to the water receiving part 14.

However, the high pressure water 130 of car washing directly poured on the weather strip 10 shown in FIG. 13, as well as the water 130 of rain and car washing shown in FIG. 8, flows down from the soft top 1 and collects on an outer-cabin side edge 110 of the lower side wall. surface 12b forming the hollow seal part 12, (that is a connecting part of an outer-cabin side wall surface 12a forming the hollow seal part 12 in the same manner as the lower side wall surface 12b and the lower side wall surface 12b (the water that collects on the outer-cabin side edge 110 of the lower side wall surface 12b is shown in solid black in FIG. 13). The water 130 that collects on the outer-cabin side edge 110 of the lower side wall surface 12b flows along the outer-cabin side edge 110 which is in a longitudinal direction in which the weather strip 10 extends (in a front direction of the vehicle at this place), reaches a top end on a front side of the door glass 5 without entering the drainage hole 22 and collects on the gusset 21. Such a structure has caused problems that the collected water 130 (132) enters vehicle interior and causes water leak when the door 3 is opened.

In addition, when the door glass 5 is subjected to high pressure water as shown in FIG. 13, the water 130 directly reaches a part of the lower side wall surface 12b which is on the inner-cabin side compared with the outer-cabin side edge 110 and on the outer-cabin side compared with the door glass 5. Also, a part of the water 130, which collects on the outer-cabin side edge 110 of the lower side wall surface 12b advances and is transmitted to a space between the top end 5a of the door glass 5 and the lower side wall surface 12b of the hollow seal part 12 for the effect of capillary phenomenon. In both cases, the water 130 flows down in a frontward direction along the edge of the top end 5a of the door glass 5 and collects on the gusset 21 without entering the drainage hole 22. Such a structure has caused a problem that the collected water 130 (132) enters the vehicle interior when the door 3 is opened.

Figure 14:
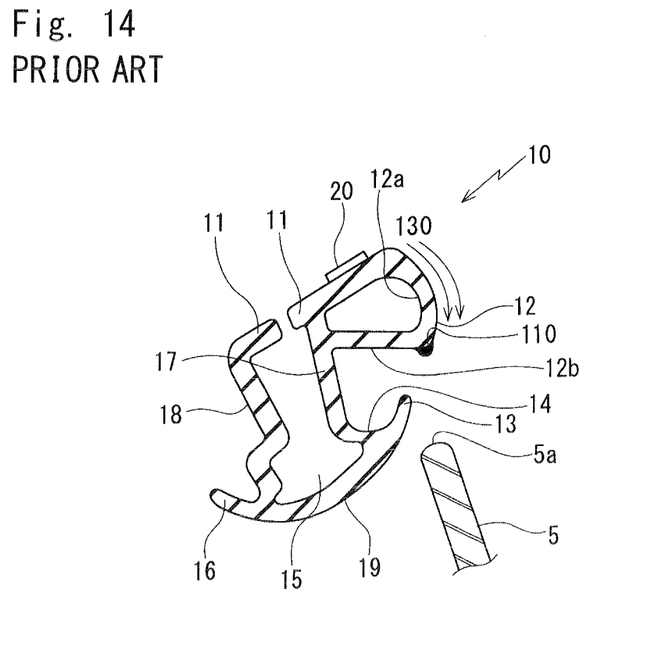
FIG. 14 is a I-I line enlarged cross section of FIG. 10, showing a state that a door glass is lowered in FIG. 11.

Further, when the door glass 5 is lowered as shown in FIG. 14 after rain or car washing, the water 130 which soaks into the soft top 1 made of cloth collects on the outer-cabin side edge 110 of the lower side wall surface 12*b* (the water that collects on the outer-cabin side edge 110 of the lower side wall surface 12*b* is shown in solid black in FIG. 14). Accordingly, the water 130 flows down in the longitudinal direction in which the weather strip 10 extends and collects on the gusset 21 without entering the drainage hole 22. Such a structure has caused a problem that the collected water 130 (132) enters the vehicle interior when the door 3 is opened.

While the above-mentioned prior arts relate to the drainage structure of the weather strip 10 installed on the side edge of the front pillar 4, the weather strips installed on side edges (roof side edges) of the soft tops 1 or side edges of rear pillars also cause the same problems. Also, the weather strips installed on side edges of front pillars, rear pillars and roofs of hard top vehicles, not only of retractable roof vehicles, cause the same problems.

In addition, the drainage structures of the weather strip according to the Japanese unexamined Patent Publications No. 2006-264594 and 10-71860 do not provide measures to prevent the water 130 which is collected on the outer-cabin side edge 110 of the lower side wall surface 12*b* of the hollow seal member 12 forming the weather strip 10 from flowing frontward in the longitudinal direction of the weather strip 10 and along the top end 5*a* of the door glass 5, and finally entering the vehicle interior.

Therefore, an object of the present invention is to provide the drainage structure of the weather strips capable of preventing the rainwater or car-washing water from entering the vehicle interior from the door opening edges of the retractable roof vehicles or the hard top vehicles.

SUMMARY OF THE INVENTION

In order to achieve the above-mentioned object, a first aspect of the invention provides a drainage structure of a weather strip (10) comprising: an installation base member (11) installed on a door (3) opening edge of a retractable roof vehicle or a hard top vehicle; a hollow seal part (12) provided downward on an outer-cabin side with respect to said installation base member (11), which makes elastic contact with a top end (5*a*) of a door glass (5); and a seal lip (13) extending from a lower side of said hollow seal part (12) toward an outer-cabin side, of which top end curves upward and makes elastic contact with an inner-cabin side surface of said door glass (5), thereby forming an eaves-trough-shaped water receiving part (14), wherein:

a lower side wall surface (12*b*) forming said hollow seal part (12), with which the top end (5*a*) of said door glass (5) makes elastic contact, has a bead part (30) formed at least on an elastic contact position thereof with the top end (5*a*) of said door glass (5).

A second aspect of the invention provides a drainage structure of a weather strip (10) comprising: an installation base member (11) installed on a door (3) opening edge of a retractable roof vehicle or a hard top vehicle; a hollow seal part (12) provided downward on an outer-cabin side with respect to said installation base member (11), which makes elastic contact with a top end (5*a*) of a door glass (5); and a seal lip (13) extending from a lower side of said hollow seal part (12) toward an outer-cabin side, of which top end curves upward and makes elastic contact with an inner-cabin side surface of said door glass (5), thereby forming an eaves-trough-shaped water receiving part (14), wherein:

a lower side wall surface (12*b*) forming said hollow seal part (12), with which the top end (5*a*) of said door glass (5) makes elastic contact, has a bead part (30) formed from an outer-cabin side edge (110) at least to a position beyond an elastic contact position on the bead part (30) with the top end (5*a*) of said door glass (5) toward an inner-cabin side; and said bead part (30) is inclined downward.

According to the first and second aspects of the invention, the bead part (30) is formed on the lower side wall surface (12*b*) forming the hollow seal part (12) of the weather strip (10) installed on the door (3) opening edge of the retractable roof vehicle or the hard top vehicle. Accordingly, the bead part (30) may be formed on an extrusion molded part or a die molded part and any of a side edge of a front pillar, a side edge of a roof and a side edge of a rear pillar.

A third aspect of the invention provides the drainage structure of the weather strip (10) according to the second aspect of the invention, wherein: an inner-cabin side edge of said bead part (30) is extended to an inner-cabin side surface of said door glass (5) for guiding water (130) flowing along said bead part (30) to said water receiving part (14).

A fourth aspect of the invention provides the drainage structure of the weather strip (10) according to the third aspect of the invention, wherein: said seal lip (13) has a hollow part (15) provided on an inner-cabin side thereof while said water receiving part (14) has a drainage hole (22) formed thereon which bores to said hollow part (15); an inner-cabin side edge of said bead part (30) is extended to a point in front of said drainage hole (22); and the water (130) guided to said water receiving part (14) is further guided to said hollow part (15) via said drainage hole (22).

Symbols in parentheses show constituents or items corresponding to Figures and DESCRIPTION OF PREFERRED EMBODIMENT.

According to the drainage structure of the weather strip according to the first aspect of the present invention, the weather strip installed on the door opening edge of the retractable roof vehicle or the hard top vehicle comprises the hollow seal part which makes elastic contact with the top end of the door glass and the seal lip which makes elastic contact with the inner-cabin side surface of the door glass when the door glass is closed. As a result, the door glass is doubly-sealed on an upper side and a lower side thereof.

Such a structure prevents the water of rain or car washing from entering the inner-cabin side via a space between the top end of the door glass and the hollow seal part. Even in case the water enters the inner-cabin side, the water that flows down an inner-cabin side surface of the door glass is dammed up by the seal lip and is guided to the eaves-trough-shaped water receiving part. Therefore, the structure is excellent in water-tightness.

Especially, the lower side wall surface of the hollow seal part, with which the top end of the door glass makes elastic contact, has the bead part formed at least on the elastic contact position thereof with the top end of the door glass. Therefore, when the top end of the door glass abuts the bead part, the lower side wall surface bends, thereby forming two ditches respectively on both ends of the bead part.

Accordingly, the water which flows along an edge of a top end of the door glass flows down the inner-cabin side or the outer-cabin side via the two ditches thus formed, thereby preventing the water from entering vehicle interior.

According to the drainage structure of the weather strip according to the second aspect of the present invention, the lower side wall surface of the hollow seal part, with which the top end of the door glass makes elastic contact, has the bead part formed from the outer-cabin side edge at least to the position beyond the elastic contact position on the bead part with the top end of the door glass toward the inner-cabin side, and the bead part is inclined downward. Accordingly, when the door glass is closed, the water of rain and car washing, which flows down the outer-cabin side from the roof and the water of car washing directly poured on the weather strip normally collects on the outer-cabin side edge of the lower side wall surface. Then the water thus collected flows down in a longitudinal direction in which the weather strip extends (in a front direction or rear direction of the vehicle) to the bead part and is imperatively guided from the outer-cabin side to the inner-cabin side along the bead part. The water is further guided at least to the position beyond the elastic contact position on the bead part with the top end of the door glass toward the inner-cabin side. As a result, the water directly falls into the eaves-trough-shaped water receiving part; falls down from the inner-cabin side of the lower side wall surface along a wall surface (for example, in the present embodiment, an outer-cabin side vertical wall 17 in FIG. 2 and FIG. 3) which the inner-cabin side of the lower side wall surface abuts; or falls down the inner-cabin side surface of the door glass and is dammed up by the seal lip, and then guided into the eaves-trough-shaped water receiving part.

The bead part bends for the effect of the pressure by the top end of the door glass, thereby forming two ditches respectively on both ends of the bead part. Accordingly, the water which flows along the bead part flows along the ditches thus formed when the door glass is closed and is stably guided into the water receiving part without water leak into the vehicle interior.

Such a structure prevents the problem according to the prior art that the water that collects on the outer-cabin side edge of the lower side wall surface of the hollow seal part reaches the top end on the front side of the door glass along the longitudinal direction of the weather strip, collects on the gusset 21, enters the vehicle interior when the door is opened and causes water leak.

In addition, a part of the water that collects on the outer-cabin side edge of the lower side wall surface is transmitted to a space between the top end of the door glass and the lower side wall surface of the hollow seal part for the effect of the capillary phenomenon. But the water is shut down by the bead part which is on the front side of a water flow direction or facing the water flow direction or is guided to the inner-cabin side along the bead part and further to the water receiving part. Such a structure prevents the problem according to the prior art that the water which flows down in the frontward direction along the edge of the top end of the door glass reaches the top end on the front side of the door glass and collects on the gusset 21, and the collected water enters vehicle interior when the door is opened.

In addition, when the door glass is lowered after the rain or car washing, the water which soaks into the soft top may collect on the outer-cabin side edge of the lower side wall surface. But, even while the door glass is open, the water flows down in a longitudinal direction in which the weather strip extends, is imperatively guided from the outer-cabin side to the inner-cabin side along the bead part and is further guided into the water receiving part. Such a structure prevents the water from entering the vehicle interior and causing water leak and significantly decreases the amount of the water that drips from the outer-cabin side edge of the lower side wall surface of the hollow seal part.

Figure 2:
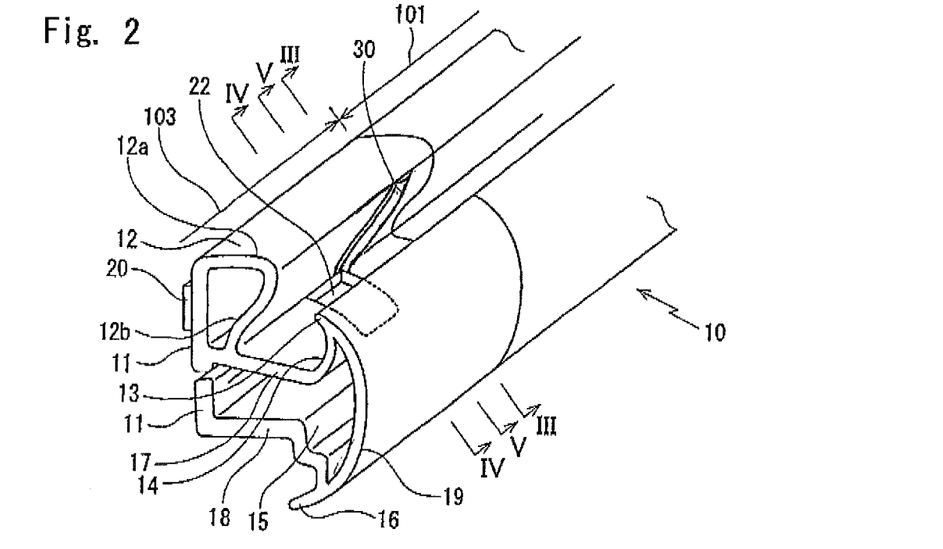
FIG. 2 is an enlarged perspective view of part 150 of FIG. 2.
Figure 3:
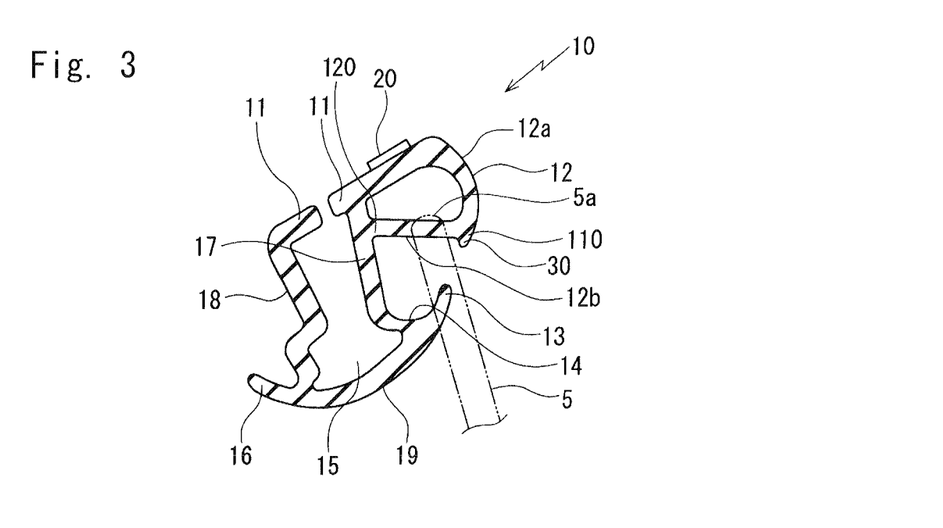
FIG. 3 is a III-III line enlarged cross section of FIG. 2.

According to the third aspect of the invention, since the inner-cabin side edge of the bead part is extended to the inner-cabin side surface of the door glass, the water which flows along the bead part directly falls into the water receiving part or is easily guided from the inner-cabin side of the lower side wall surface along the wall surface (for example, in the present embodiment, the outer-cabin side vertical wall 17 in FIG. 2 and FIG. 3) which the inner-cabin side of the lower side wall surface abuts. Accordingly, the amount of the water is decreased, which flows along the bead part, is transmitted along the inner-cabin side surface of the door glass, is dammed up by the seal lip and is guided to the water receiving part.

Such a structure reduces the burden of sealing function of the seal lip.

According to the fourth aspect of the invention, the seal lip has a hollow part provided on the inner-cabin side thereof while the water receiving part has a drainage hole formed thereon which bores to the hollow part and the inner-cabin side edge of the bead part is extended to the point in front of the drainage hole. Accordingly, the water guided to the water receiving part is further guided to the hollow part without fail via the drainage hole. Such a structure further improves the water-tightness.

DESCRIPTION OF PREFERRED EMBODIMENT

Figure 1:
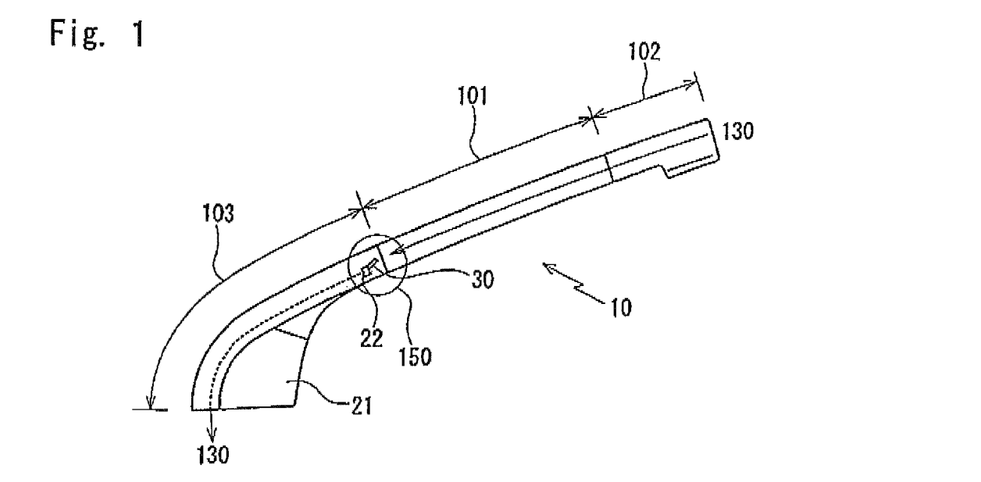
FIG. 1 is a perspective view showing a drainage structure of a weather strip according to an embodiment of the present invention.
Figure 4:
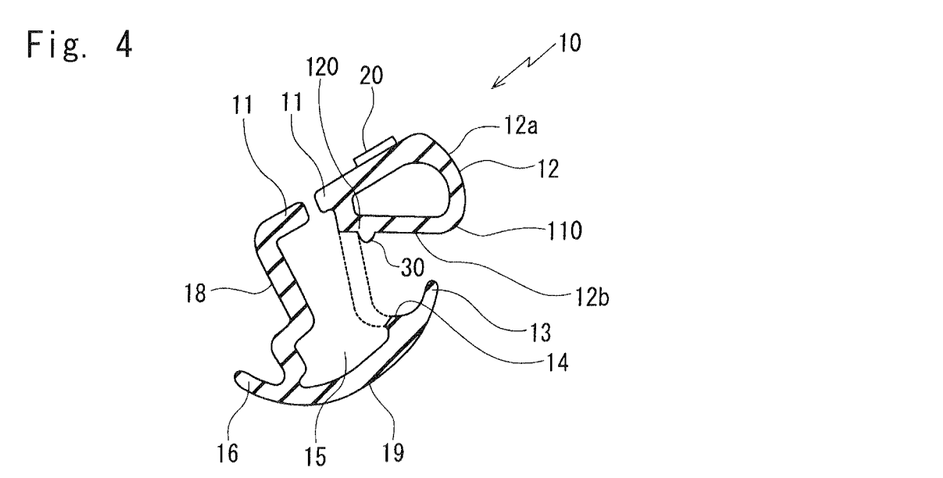
FIG. 4 is a IV-IV line enlarged cross section of FIG. 2.
Figure 5:
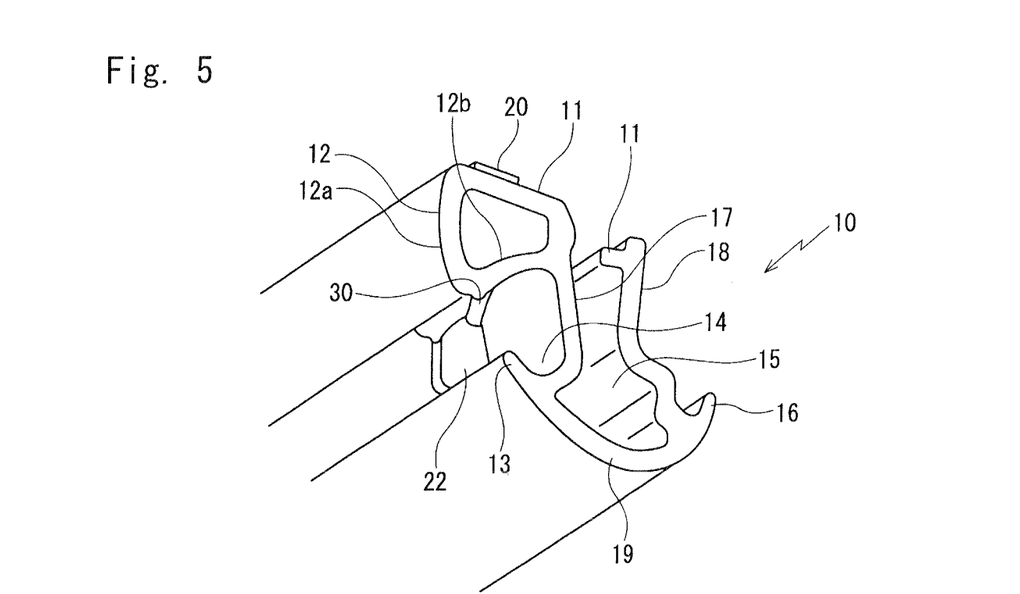
FIG. 5 is a perspective view showing relation between a drainage hole and an upper part of a bead part of the drainage structure of the weather strip according to the embodiment of the present invention.
Figure 6:
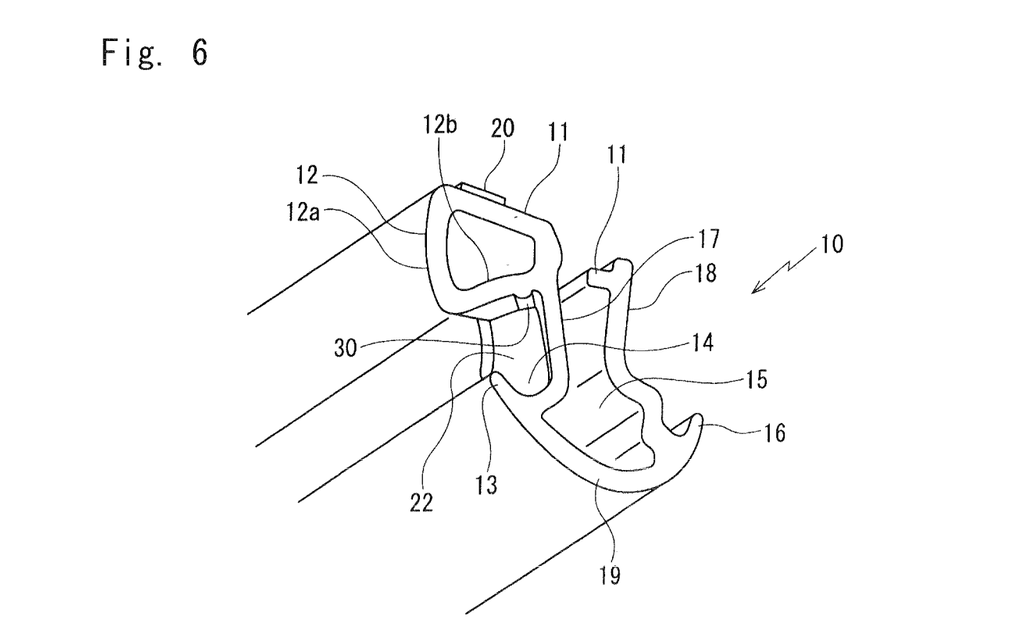
FIG. 6 is a perspective view showing relation between the drainage hole and a lower part of the bead part of the drainage structure of the weather strip according to the embodiment of the present invention.

Referring to FIG. 1 to FIG. 7, a drainage structure of a weather strip according to an embodiment of the present invention will be described. FIG. 1 is a perspective view showing a drainage structure of a weather strip according to an embodiment of the present invention. FIG. 2 is an enlarged perspective view of part 150 of FIG. 1. FIG. 3 and FIG. 4 are respectively III-III line and IV-IV line enlarged cross sections of FIG. 2. FIG. 5 and FIG. 6 are perspective views showing the relations between the drainage hole and the bead part of the drainage structure of the weather strip according to the embodiment of the present invention, of which FIG. 5 shows an upper part of the bead part and FIG. 6 shows a lower part of the bead part.

When constituents or items correspond to those in prior arts, the same symbols are used.

The drainage structure of the weather strip according to the embodiment of the present invention relates to vehicles shown in FIG. 8, of which a soft top 1 that opens or closes is folded and put away in a trunk 2. Especially, the invention relates to a weather strip 10 having a bead part 30 formed thereon.

The weather strip 10 is installed on a side edge of a front pillar 4 and a side edge of a soft top 1 as a door 3 opening edge via tape 20 (alternatively, the weather strip 10 may also be fit in holders including retainers). The weather strip 10 makes elastic contact with a door glass (side glass) 5 that lifts or lowers when the door 3 is closed to seal outside and inside of the vehicle. As shown in FIG. 1, the weather strip 10 installed on the side edge of the front pillar 4 comprises an extrusion molded part 101 which has die molded parts 102, 103 connected thereto which are respectively on an upper side and a lower side of the vehicle when the weather strip 10 is assembled on the vehicle. The die molded part 102 on the upper side is connected to an edge of a header weather strip (not shown) installed on a header 7 which fixes an upper end of a front glass 6 whereas the die molded part 103 on the lower side has a gusset 21 installed thereon, which is unified with a door mirror (not shown).

As shown in FIG. 2, the weather strip 10 comprises: an installation base member 11 installed on the door 3 opening edge; a hollow seal part 12 provided downward on an outer-cabin side with respect to said installation base member 11, which makes elastic contact with a top end 5a of a door glass 5; and a seal lip 13 extending from a lower side of the hollow seal part 12 toward an outer-cabin side, of which top end curves upward and makes elastic contact with an inner-cabin side surface of the door glass 5, thereby forming an eaves-trough-shaped water receiving part 14. The seal lip 13 has a hollow part 15 provided on an inner-cabin side thereof and the hollow part 15 has a lip 16 on an inner-cabin side thereof which abuts interior material (not shown) including garnish.

On the die molded parts 102, 103, the installation base member 11 has a part thereof split for inserting a core for die molding whereas, on an extrusion molded part 101, the installation base member 11 is directly connected thereto. The installation base member 11 has an outer-cabin side vertical wall 17 provided on a lower side trom rough center thereof. The outer-cabin side vertical wall 17 has a seal lip 13 provided on top end thereof. The hollow seal 12 comprises: an outer-cabin side wall surface 12a that curves from an outer-cabin side edge of the installation base member 11 in such a manner as to project toward the outer-cabin side; and a lower side wall surface 12b of which an outer-cabin side edge is connected to a lower end of the outer-cabin side wall surface 12a whereas an inner-cabin side edge is connected to an upper part of the outer-cabin side vertical wall 17 at a distance from the installation base member 11. The top end 5a of the door glass 5 as lifted makes elastic contact with roughly the center of the lower side wall surface 12b.

Figure 7:
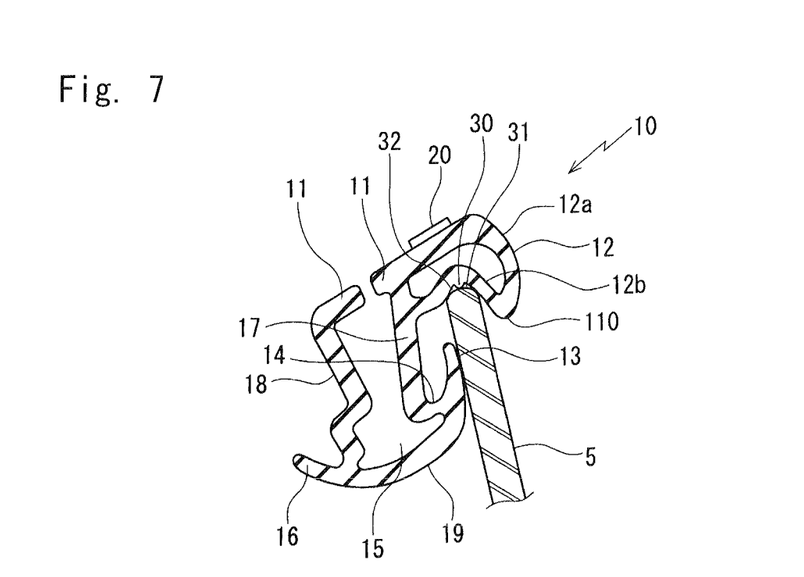
FIG. 7 a V-V line enlarged cross section of FIG. 2, showing a state that a door glass is lifted.

When the top end 5a of the door glass 5 makes elastic contact, the lower side wall surface 12b curves upward and wraps the top end 5a of the door glass 5 in a manner shown in FIG. 7 and FIG. 13. FIG. 7 shows a position with the bead part 30 and FIG. 13 shows another position without the bead part 30.

The installation base member 11 has an inner-cabin side vertical wall 18 provided on a lower side from the inner-cabin side edge thereof. The hollow part 15 is encircled by the outer-cabin side vertical wall 17, the inner-cabin side vertical wall 18, a bottom wall 19 which connects lower ends of the vertical walls 17, 18 and curves downward, and a part of the installation base member 11 on the inner-cabin side.

As shown in FIG. 2 and FIG. 4, the die molded part 103 on the lower side has a drainage hole 22 formed thereon, which bores from the water receiving part 14 to the hollow part 15 so that water 130 guided on the water receiving part 14 from an upper side to a lower side of the weather strip 10 is further guided to the hollow part 15 via the drainage hole 22. The water 130 guided to the hollow part 15 is drained outside the vehicle from a front side of the vehicle. The drainage hole 22 is rectangular and is formed by removing the outer-cabin side vertical wall 17 together with a part of the water receiving part 14 on the inner-cabin side.

Examples of the structure of the drainage hole 22 include a structure that a surface which is vertical to a longitudinal direction of the water receiving part 14 is provided and a tunnel is provided on the surface in order to connect the drainage hole 22 and the hollow part 15. In the structure, the bead part 30 is extended to a point in front of the tunnel or an inside of the tunnel.

As shown in FIG. 2, the lower side wall surface 12b forming the hollow seal part 12 of the weather strip 10 has a band-like bead part 30 formed thereon, of which inner cabin side is inclined toward the drainage hole 22 and central part protrudes downward thereby forming a projection. The bead part 30 extends from an outer-cabin side edge 110 of the lower side wall surface 12b, that is a connecting part of an outer-cabin side wall surface 12a and the lower side wall surface 12b, to an inner-cabin side edge 120 of the lower side wall surface 12b, that is a connecting part of the lower side wall surface 12b with the outer-cabin side vertical wall 17, beyond a contact position with the top end 5a of the door glass 5 toward an inner-cabin side. An inner-cabin side edge of the bead part 30 is extended to the point in front of the drainage hole 22. Alternatively, the inner-cabin side edge of the bead part 30 may be connected to the drainage hole 22, not extended to the point in front of the drainage hole 22, or extended in such a manner as to protrude inside the drainage hole 22.

The bead part 30 is die molded simultaneously with the weather strip 10 and made of rubber-like elastic body.

According to the drainage structure of the weather strip according to the embodiment, when the door glass is closed, the top end 5a of the door glass 5 makes elastic contact with the lower side wall surface 12b of the hollow seal part 12 whereas the seal lip 13 makes elastic contact with the inner-cabin side surface of the of the door glass 5. As a result, the door glass 5 is doubly-sealed on an upper side and a lower side thereof. Such a structure prevents the water 130 of rain or car washing from directly entering the inner-cabin side from outer-cabin side. Even in case the water 130 enters the inner-cabin side, the water that flows down the inner-cabin side surface of the door glass 5 is dammed up by the seal lip 13 and is guided to the eaves-trough-shaped water receiving part 14. Therefore, the structure is excellent in water-tightness.

Especially, the lower side wall surface 12b of the hollow seal part 12, with which the top end 5a of the door glass 5 makes elastic contact, has the bead part 30 formed from the outer-cabin side edge 110 to the point in front of the drainage hole 22 beyond the elastic contact position with the top end 5a of the door glass 5 toward the inner-cabin side and the bead part 30 is inclined downward toward the inner-cabin side. Accordingly, when the door glass is closed, the water 130 of rain and car washing, which flows along the soft top 1 toward the outer-cabin side, and the water 130 of car washing directly poured on the weather strip 10 normally collects on the outer-cabin side edge 110 of the lower side wall surface 12h of the hollow seal part 12. Then the water 130 thus collected flows down in a longitudinal direction in which the weather strip 10 extends (in a front direction of the vehicle), is imperatively guided from the outer-cabin side to the inner-cabin side of the door glass 5 along the bead part 30 and is stably guided to the drainage hole 22.

The bead part 30 bends for the effect of the pressure by the top end 5a of the door glass 5, thereby forming two ditches 31, 32 respectively on both ends of the bead part 30 as shown in FIG. 7. Accordingly, the water 130, which flows along the bead part 30, flows along the ditches 31, 32 thus formed when the door glass is closed and is stably guided into the drainage hole 22 without water leak into the vehicle interior.

Such a structure prevents the problem according to the prior art that the water 130 that collects on the outer-cabin side edge 110 of the lower side wall surface 12b of the hollow seal part 12 flows in the longitudinal direction of the weather strip 10, reaches the top end on the front side of the door glass 5, collects on the gusset 21, enters the vehicle interior when the door 3 is opened and causes the water leak.

In addition, a part of the water 130 collected on the outer-cabin side edge 110 of the lower side wall surface 12b of the hollow seal part 12 is transmitted to a space between the top end 5a of the door glass 5 and the lower side wall surface 12b of the hollow seal part 12 for the effect of the capillary phenomenon. But the water 130 is shut down by the bead part 30 which is on the front side of a water 130 flow direction or facing the water 130 flow direction or is guided to the inner-cabin side along the bead part 30 and further to the drainage hole 22. Such a structure prevents the problem according to the prior art that the water 130 which flows down in the frontward direction along the edge of the top end 5a of the door glass 5 reaches the top end on the front side of the door glass 5 and collects on the gusset 21, and then the collected water 130 enters the vehicle interior when the door is opened.

In addition, when the door glass 5 is lowered after the rain or car washing, the water 130 which soaks into the soft top 1, especially the soft top 1 made of cloth, may collect on the outer-cabin side edge 110 of the lower side wall surface 12b of the hollow seal part 12. But, even while the door glass 5 is open, the water 130 flows down in a longitudinal direction in which the weather strip 10 extends to the bead part 30, is imperatively guided from the outer-cabin side to the inner-cabin side along the bead part 30 and is further guided to the drainage hole 22. Such a structure prevents the water 130 from entering the vehicle interior and significantly decreases the amount of the water 130 that drips from the outer-cabin side edge 110 of the lower side wall surface 12b.

While the present embodiment discloses that the bead part 30 is made of rubber-like elastic body and is die molded simultaneously with the weather strip 10, the bead part 30 may be molded separately from the weather strip 10 and adhered on the weather strip 10 after molding, not integrally molded. In addition, the bead part 30 is not necessarily made of rubber-like elastic body because any bead part 30 as a water course that guides the water 130 from the outer-cabin side beyond the top end 5a of the door glass 5 toward the inner-cabin side performs water-proof effect.

The inner-cabin side edge of the bead part 30 is extended further than the point in front of the drainage hole 22, but the inner-cabin side edge of the bead part 30 may be extended at least beyond the elastic contact position with the top end 5a of the door glass 5 toward the inner-cabin side. More specifically, the water 130 guided to the bead part 30: directly falls into the eaves-trough-shaped water receiving part 14; falls down from the inner-cabin side of the lower side wall surface 12b along the outer-cabin side vertical wall 17; or falls down the inner-cabin side surface of the door glass 5, is dammed up by the seal lip 13 and guided into the eaves-trough-shaped water receiving part 14. Such a structure prevents the water 130 from entering the vehicle interior and causing water leak.

In addition, since the inner-cabin side edge of the bead part 30 is extended to the inner-cabin side surface of the door glass 5 or to an upper side of a line in a vertical direction of the water receiving part 14, the water 130 which flows along the bead part 30 directly falls or is easily guided to the water receiving part 14 from the inner-cabin side of the lower side wall surface 12b along the outer-cabin side vertical wall 17. Accordingly, the amount of the water 130 is decreased, which is transmitted along the inner-cabin side surface of the door glass 5, dammed up by the seal lip 13 and guided to the water receiving part 14. Such a structure reduces the burden of sealing function of the seal lip 13.

In case the lower side wall surface 12b has the bead part 30 formed at least on the elastic contact position thereof with the top end 5a of the door glass 5, the lower side wall surface 12b bends, thereby forming two ditches 31, 32 respectively on both ends of the bead part 30 when the top end 5a of the door glass 5 abuts the bead part 30. Accordingly, the water 130 which flows along the edge of the top end of the door glass flows down the inner-cabin side or the outer-cabin side via the two ditches 31, 32 thus formed, thereby preventing the water 130 from entering the vehicle interior.

The present embodiment discloses that the bead part 30 is formed on the die molded part 103 on the lower side of the weather strip 10 installed on the side edge of the front pillar 4 of the retractable roof vehicle for guiding the water 130 to the drainage hole 22 along bead part 30. But only the bead part 30 or a combination of the bead part 30 and the drainage hole 22 in the same manner as formed on the die molded part 103 on the lower side may be formed on a die molded part 102 on the upper side, on the weather strip installed on the side edge of the roof or on the weather strip installed on the side edge of the rear pillar and may be formed on the extrusion molded part or the die molded part. The bead part 30 or a combination of the bead part 30 and the drainage hole 22 may be provided on a plurality of parts, not only a singular part. The plurality of bead parts 30, for example, divide the significant amount of the water 130 with which the singular bead part 30 is packed to overflowing, guide and drain. The plurality of bead part 30 may be provided by providing one bead part 30 on the die molded part 103 on the lower side of the weather strip 10 and the other bead part 30 on the die molded part 102 on the upper side. According to the structure, on the die molded part 102 on the upper side, all or a part of the water 130 flowing down from the soft top 1 is guided to the water receiving part 14 on the inner-cabin side by the bead part 30 or flows down the outer-cabin side surface of the door glass 5 to the outer-cabin side. On the die molded part 103 on the lower side, the water 130 that collects between the bead part 30 provided on the die molded part 102 on the upper side and the bead part 30 provided on the die molded part 103 on the lower side or the water 130 that remains and flows down from the soft top 1 is guided to the water receiving part 14 on the inner-cabin side. Also, the water 130 is flowed down the outer-cabin side surface of the door glass 5 to the outer-cabin side. Accordingly, the water 130 is guided through two stages. Further, a plurality of bead parts 30, two or three for example, adjacent to each other may be consecutively provided.

As mentioned above, the bead part 30 is not necessarily provided in combination with the drainage hole 22 because the bead part 30, which extends from the outer-cabin side beyond the elastic contact position with the top end 5a of the door glass 5 toward the inner-cabin side, guides the water 130 flowing along the bead part 30 to the water receiving part 14 without fail. When providing only the bead part 30, the bead part 30 may be extended to the water receiving part 14 for guiding the water 130 to the water receiving part 14.

But the combination of the bead part 30 and the drainage hole 22 drains the water 130 more effectively.

Examples of positions for providing the combination of the bead part 30 and the drainage hole 22 on the extrusion molded part include the center of the extrusion molded part 101 in FIG. 1. In addition, the present invention may be adopted on the retractable roof vehicle including: a soft top roof; a roof comprising a roof panel and a back window panel at the back of the roof panel which are folded and put away in the trunk 2 while the roof panel as folded is piled on the back window panel; and a removal roof.

Further, the formation of the bead part is not limited on the weather strip installed on the retractable roof vehicle and may be formed on the weather strips installed on the side edge of the front pillar, the side edge of the roof and the side edge of the rear pillar of the hard top vehicle.

We claim:

1. A weather strip comprising: an installation base member installed on a door opening edge of a vehicle; a hollow seal part provided on an outer-cabin side with respect to said installation base member, and makes elastic contact with a top end of a door glass when the door glass is in a closed position; and a seal lip extending from the base member toward the outer-cabin side, the seal lip has an end that curves upward and makes elastic contact with an inner-cabin side surface of said door glass when the door glass is in said closed position, whereby said hollow seal part and the seal lip form a trough-shaped water receiving part, wherein:

a lower side wall surface of said hollow seal part, with which the top end of said door glass makes said elastic contact when the door glass is in said closed position, has a bead part formed thereon, said bead part extending from an inner-cabin side edge of said hollow seal part toward an outer-cabin edge of said hollow seal part to a position beyond an elastic contact point of the bead part with the top end of said door glass when said door glass is in said closed position; and said bead part extends from a drainage hole of the weather strip at an acute angle with respect to a longitudinal axis of the hollow seal part;

the bead part bending due to pressure applied by contact with the top end of the door glass when the door glass is in said closed position whereby two depressions for drainage are formed between the hollow seal part and sides of the bead part.

2. The weather strip as claimed in claim 1, wherein:
said bead part extends beyond the inner-cabin side surface of said door glass for guiding water flowing along said bead part to said water receiving part.

3. The weather strip as claimed in claim 2, wherein:
said seal lip has a hollow part and said drainage hole formed therein; and the water guided to said water receiving part is further guided to said hollow part of said sea lip via said drainage hole.

4. The weather strip as claimed in claim 2, wherein:
the weather strip comprises an extrusion molded part which has die molded parts connected thereto which are respectively on an upper side and a lower side of said extrusion molded part; and
said bead part is provided on at least one of the die molded parts.

5. The weather strip as claimed in claim 4, wherein:
said seal lip has a hollow part and said drainage hole formed therein; and the water guided to said water receiving part is further guided to said hollow part of said sea lip via said drainage hole.

6. The weather strip as claimed in claim 2, wherein:
the weather strip comprises an extrusion molded part which has die molded parts connected thereto which are respectively on an upper side and a lower side of said extrusion molded part; and
said bead part is provided on said lower side die molded part.

7. The weather strip as claimed in claim 6, wherein:
said seal lip has a hollow part and said drainage hole formed therein; and the water guided to said water receiving part is further guided to said hollow part of said sea lip via said drainage hole.

8. The weather strip as claimed in claim 1, wherein:
the weather strip comprises an extrusion molded part which has die molded parts connected thereto which are respectively on an upper side and a lower side of said extrusion molded part; and
said bead part is provided on said lower side die molded part.

9. The weather strip as claimed in claim 1, wherein:
the weather strip comprises an extrusion molded part which has die molded parts connected thereto which are respectively on an upper side and a lower side of the extrusion molded part; and
said bead part is provided at least one of the die molded parts.

* * * * *